United States Patent
Yamagiwa et al.

[11] Patent Number: 6,106,647
[45] Date of Patent: Aug. 22, 2000

[54] PROCESS FOR PRODUCING SEALANT-INCORPORATED TIRE TUBE

[75] Inventors: Toshio Yamagiwa, Saitama; Noboru Makisaka; Tomoyoshi Hino, both of Gifu, all of Japan

[73] Assignees: Honda Giken Kogyo Kabushiki Kaisha, Tokyo; Inoue Rubber Co., Ltd., Nagoya, both of Japan

[21] Appl. No.: 09/051,467

[22] PCT Filed: Aug. 28, 1997

[86] PCT No.: PCT/JP97/03004

§ 371 Date: Apr. 14, 1998

§ 102(e) Date: Apr. 14, 1998

[87] PCT Pub. No.: WO98/08670

PCT Pub. Date: Mar. 5, 1998

[30] Foreign Application Priority Data

Aug. 28, 1996 [JP] Japan ................................. 8-226487

[51] Int. Cl.$^7$ ................................................. B29D 23/24
[52] U.S. Cl. ........................ 156/87; 152/506; 156/115; 156/119; 156/122
[58] Field of Search ................................. 156/115, 119, 156/118, 120, 121, 122, 97, 87; 152/506, 507, 503, 511

[56] References Cited

U.S. PATENT DOCUMENTS

| | | | |
|---|---|---|---|
| 1,689,907 | 10/1928 | Allen | 152/507 |
| 2,536,717 | 1/1951 | Boyer | 156/97 |
| 4,347,096 | 8/1982 | Schorscher | 156/97 |

FOREIGN PATENT DOCUMENTS

| | | |
|---|---|---|
| 29-2643 | 5/1954 | Japan . |
| 33-4708 | 3/1958 | Japan . |
| 54-61705 | 5/1979 | Japan . |
| 58-74342 | 5/1983 | Japan . |
| 9-174710 | 7/1997 | Japan . |
| 9-300481 | 11/1997 | Japan . |

*Primary Examiner*—Geoffrey L. Knable
*Attorney, Agent, or Firm*—Arent Fox Kintner Plotkin & Kahn, PLLC

[57] ABSTRACT

A tube blank 2' whose inside is divided into an air chamber 3 and a sealant chamber 7 by a partition wall 5 has an air relief port 4$_1$ provided in a sealant chamber peripheral wall 4o and communicating a sealant chamber 7. At a vulcanizing step, the tube blank 2' is placed into a heating die 18, and a gas of a high temperature and a high pressure is supplied into an air chamber 3. This causes air remaining in the sealant chamber 7 to be discharged through the air relief port 4$_1$, while bringing the partition wall 5 into close contact with the sealant chamber peripheral wall 4o, thereby performing a reliable vulcanization. When the tube blank 2' is removed from the heating die 18, the sealant chamber 7 is not expanded because of the existing of the air relief port 4$_1$ and therefore, the partition wall 5 cannot be provided with an expanding tendency that forces the wall 5 to be stretched toward the air chamber peripheral wall 4i.

3 Claims, 12 Drawing Sheets

FIG.2
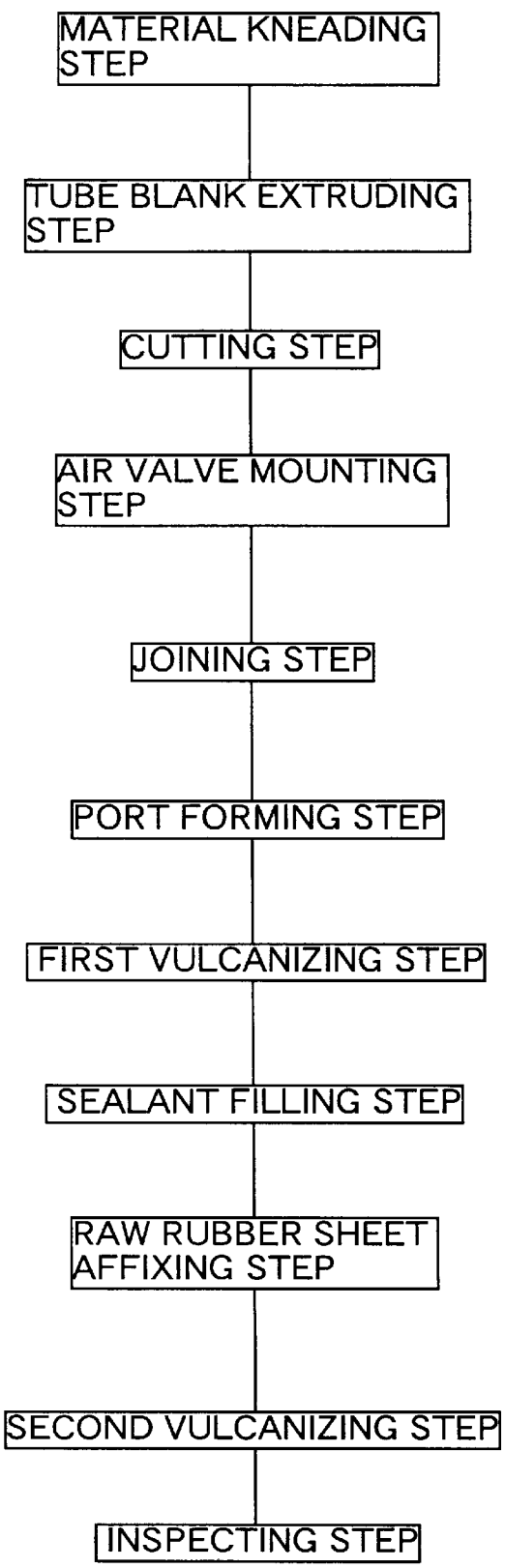
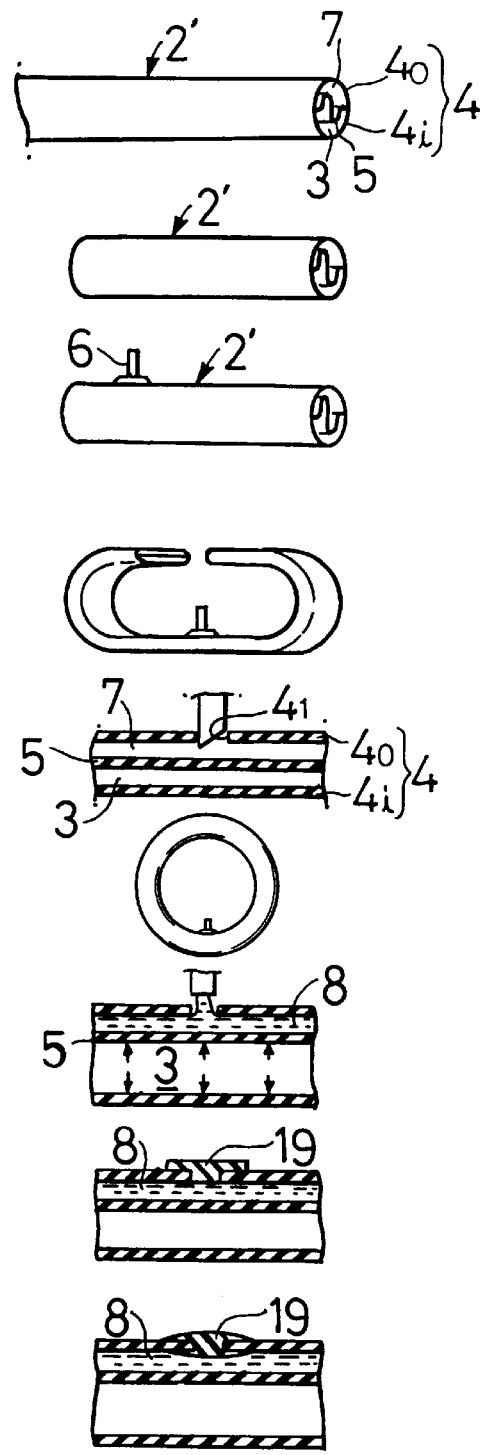

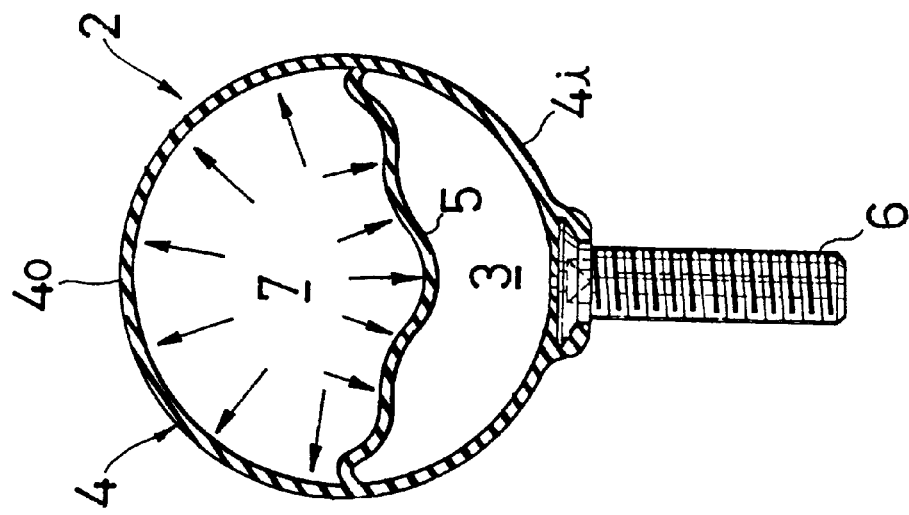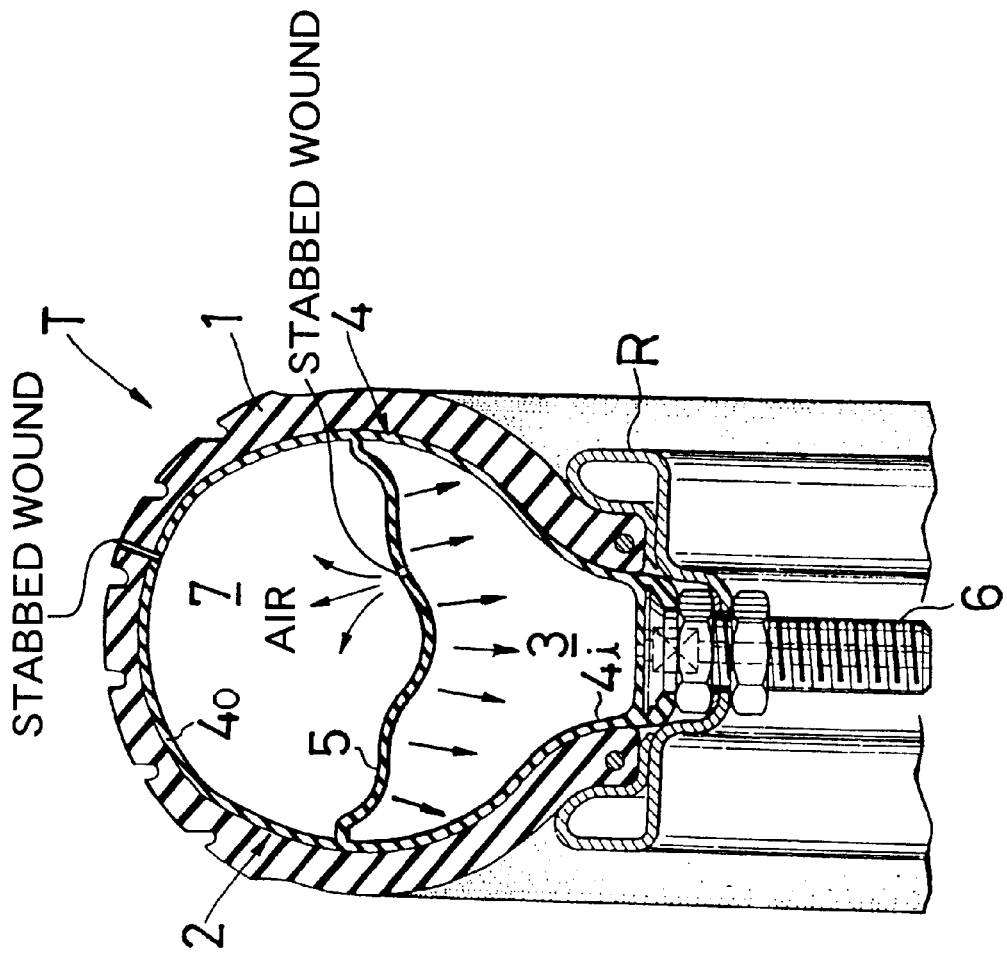

PROCESS FOR PRODUCING SEALANT-INCORPORATED TIRE TUBE

FIELD OF THE INVENTION

The present invention relates to a process for producing a sealant-incorporated tire tube which has an air chamber filled with air, and a sealant chamber filled with a sealant.

BACKGROUND ART

In a common tube-incorporated tire, when the tube is wounded by stabbing with a nail or the like, air within the tube is liable to be leaked from the stabbed wound through a small gap between the tire and the tube and through a nipple bore in a rim to the outside, leading to a so-called punctured state.

Therefore, there is conventionally known a tire tube having a suitable amount of a liquid sealant previously filled therein to automatically and temporarily repair a stabbed wound produced upon stabbing of the tube (see Japanese Patent Application Laid-open No. 58-74342). This tire tube is formed by previously incorporating a capsule filled with a sealant within the tube at the time of molding the tube, and breaking the capsule after molding of the tube to charge the sealant into the tube. For this reason, when an external force is applied to the capsule to break the capsule, the tube is liable to be damaged and moreover the sealant may clog an air valve of the tube, and or clog a pressure gauge when the pressure of the air in the tube is measured, in some cases.

To avoid this, it is conceived that the inside of the tube is divided by a partition wall into an air chamber filled with air and a sealant chamber filled with a sealant, so that the sealant can be filled directly into the sealant chamber without use of a capsule.

At a step of vulcanizing the sealant-incorporated tire tube having such a construction, a tube blank is placed into a heating die, and heated air or water vapor of a high temperature is supplied through the air valve into the air chamber, thereby bringing the peripheral walls of the air chamber and the sealant chamber into close contact with the heating die and bringing the partition wall into close contact with the peripheral wall of the sealant chamber. In this state, the heating die is heated to perform the vulcanization. In this case, if the air remains within the sealant chamber in the tube blank placed in the heating die, even if the heated air or the water vapor of the high temperature is supplied into the air chamber, the partition wall may not be brought into close contact with the peripheral wall of the sealant chamber, resulting in a possibility that the tube blank may only unevenly be heated.

In addition, if the vulcanization is carried out in a state in which the air remains within the sealant chamber, when the tube blank is removed from the heating die, the air encapsulated and thermally expanded in the sealant chamber, forces the partition wall to be expanded toward the peripheral wall of the air chamber, and thus, an expanding tendency or bias is provided to the partition wall. If the expanding tendency or bias is provided to the partition wall in this manner, when the peripheral wall of the sealant chamber and the partition wall are wounded by stabbing with a nail or the like, the partition wall is spread toward the peripheral wall of the air chamber, thereby providing a possibility that the air within the air chamber may flow into the sealant chamber to reduce the effect of the sealant.

DISCLOSURE OF THE INVENTION

The present invention has been proposed in view of the above-mentioned circumstances and an object of the invention is to provide a process for producing a sealant-incorporated tire tube, which process enables the vulcanization of a tube blank material to be carried out reliably and provides a tube having a partition wall free of an expanding bias or tendency.

To achieve the above-mentioned object, according to a first aspect and feature of the present invention, there is proposed a process for producing a sealant-incorporated tire tube which has an air chamber filled with air and a sealant chamber filled with a sealant, the process comprising a first step of obtaining by extrusion molding a tube blank having a peripheral wall of a circular cross section, the tube blank being divided inside the peripheral wall into the air chamber and the sealant chamber by a partition wall; a second step of joining opposite ends of the tube blank together to form the blank of an annular configuration; a third step of forming an air relief port in the peripheral wall which port is communicated with the sealant chamber; a fourth step of placing the tube blank in a heating die and in that state subjecting the blank to vulcanization with supply of a gas of a high temperature and high pressure into the air chamber; a fifth step of filling the sealant chamber with the sealant; and a sixth step of closing the air relief port.

Owing to the above process, a tube blank is obtained by extrusion molding so as to have a peripheral wall of a circular cross section and be divided inside the peripheral wall into an air chamber and a sealant chamber by a partition wall, a sealant is filled into the sealant chamber through an air relief port and thereafter the air relief port is closed. This makes it possible to reliably separate the air chamber and the seal chamber from each other while preventing the tube from being damaged, and to avoid inconveniences such as clogging of an air valve with the sealant and leakage of the sealant to the outside. Further, since it is arranged that after an air relief port, which is in communication with the sealant chamber, is formed in the peripheral wall of the tube blank, the blank is placed in a heating die and vulcanized, it is therefore possible to carry out the vulcanization in a reliable manner when a gas of a high temperature and high pressure is supplied into the air chamber, while bringing the partition wall into intimate contact with the peripheral wall and heating it uniformly. Moreover, the process does not give the partition wall a tendency or bias to be expanded toward the air chamber side, so that even when the tube gets wounded by stabbing with a nail or the like, the air inside the air chamber is not flown out to the sealant chamber, whereby the effect of the sealant can be exhibited sufficiently.

According to a second aspect and feature of the present invention, in addition to the first feature, the sealant is filled through the air relief port into the sealant chamber at the fifth step.

With the above construction, since the sealant is filled through the air relief port into the sealant chamber, it is unnecessary to provide a special bore for filling the sealant.

According to a third aspect and feature of the present invention, in addition to the first feature, the sixth step is a step of clamping the tube blank having a raw rubber sheet placed on the air relief port between a pair of pressing elements and pressing and binding the raw rubber sheet and the tube blank to each other, and one of the pressing elements which abuts against the tube blank on the side opposite the raw rubber sheet has a hardness lower than that of the tube blank.

With the above feature, since the hardness of one of the pair of pressing elements clamping the tube blank, which abuts against the tube blank on the side opposite the raw rubber sheet is set lower than that of the tube blank when the raw rubber sheet placed on the air relief port is pressed and bonded to the tube blank, the raw rubber sheet can be sunk into the tube blank to reduce the difference in level between the peripheral edge of the raw rubber sheet and the tube blank. Thus, the raw rubber sheet is hard to be peeled off, and also a beautiful external shape can be achieved.

BRIEF DESCRIPTION OF THE DRAWINGS

FIGS. 1–11B show a first embodiment of the present invention, in which

FIG. 1 is a cross-sectional view of a wheel equipped with a tire having a tube,

FIG. 2 is a view illustrating the production steps of the tube,

FIG. 3 is a cross-sectional view of a tube blank,

FIG. 4 is a partial perspective view of an extrusion molding machine,

FIG. 5 is a view taken in a direction of arrow 5 in FIG. 4 on an enlarged scale, FIG. 6 is a side view of a splicer, FIG. 7 is a view taken along a line 7—7 in FIG. 6 on an enlarged scale, FIG. 8 is a sectional view of a heating die, FIG. 9 is a view explaining the operation in which no air relief port is formed in the partition wall, FIGS. 11A and 11B are views explaining the operation of a case where an expanding tendency or bias is given to the partition wall.

BEST MODE FOR CARRYING OUT THE INVENTION

A first embodiment of the present invention will now be described with reference to FIGS. 1 to 11B.

Figure 1:
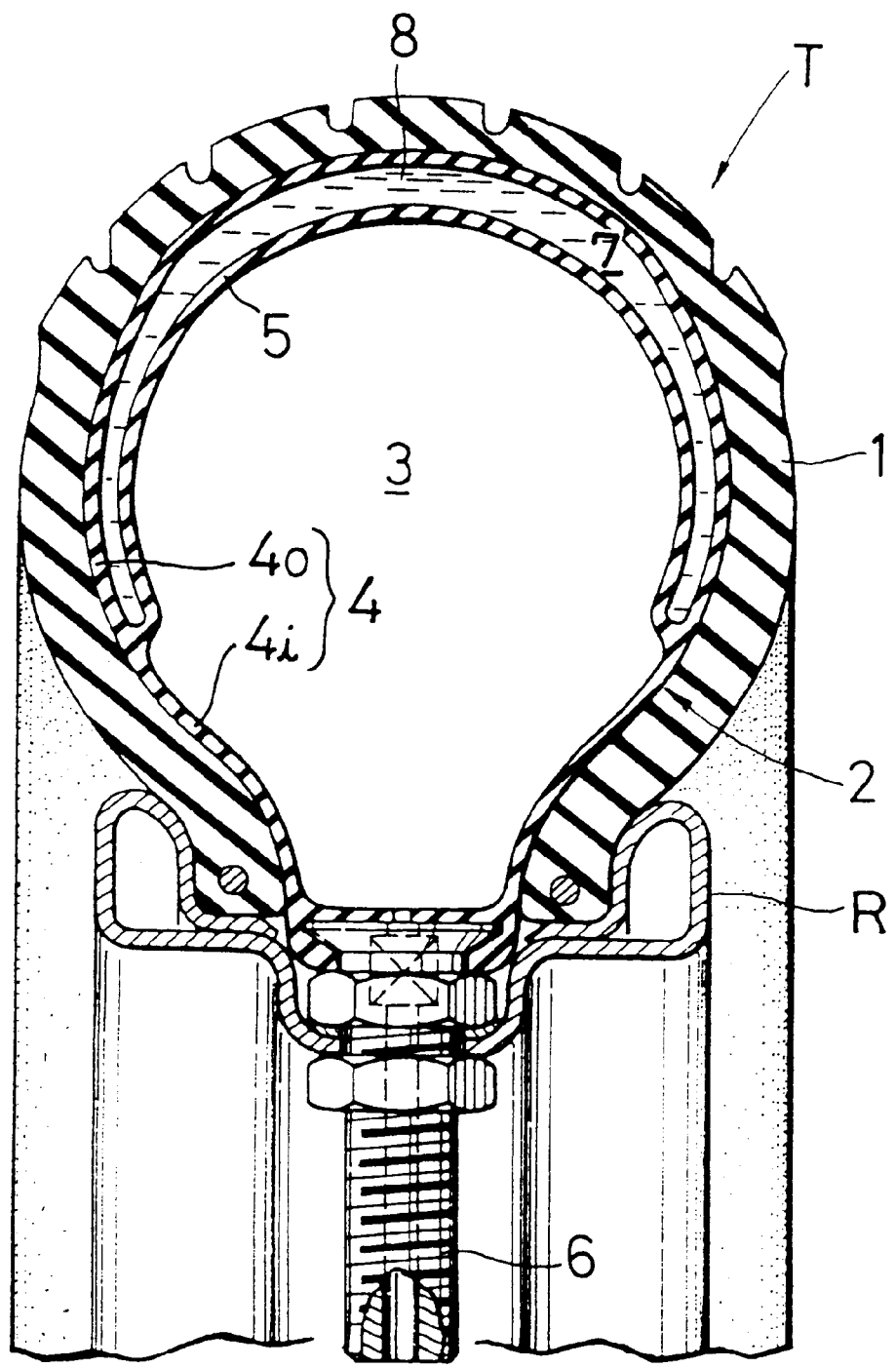

As shown in FIG. 1, a rim R of a wheel for a motorcycle is connected to a hub (not shown) through a wire spoke. A tube-incorporated tire T comprised of a tire body 1 and a tube 2 accommodated in the tire body 1 is mounted to the rim R. The tube 2 has a peripheral wall 4 which is formed into an annular shape in cross section and comprised of an air chamber peripheral wall 4i located at a radially inner side and a sealant chamber peripheral wall 4o located at a radially outer side. A pair of connections connecting the air chamber peripheral wall 4i and the sealant chamber peripheral wall 4o in the peripheral wall 4 are connected to each other by a partition wall 5 formed integrally with the connections.

Air is filled in an air chamber 3 which is circular in cross section and defined between the air chamber peripheral wall 4i and the partition wall 5, and a known liquid sealant 8 is filled in a sealant chamber 7 which is arcuate in cross section and defined between the sealant chamber peripheral wall 4o and the partition wall 5. An air valve 6 for filling air into the air chamber 3 is provided in the air chamber peripheral wall 4i.

The sealant chamber 7 in the tube 2 is maintained at a shape extending along an inner surface of the tire body 1 by the pressure of air in the air chamber 3. Therefore, even if a centrifugal force produced by the rotation of the wheel is applied to the sealant 8 filled in the sealant chamber 7, the sealant 8 can be prevented from being offset toward an outer periphery of the tube 2. Thus, even if the tube 2 is stabbed and wounded radially or sideways with a nail or the like, the sealant 8 immediately fills the stabbed wound to repair the tube 2, thereby retarding the leakage of air from the air chamber 3. The sealant 8 is held in the sealant chamber 7 and cannot flow out into the air chamber 3 and hence, the air valve 6 or a pressure gauge mounted to the air valve 6 cannot be clogged.

A process for producing the tube 2 will be described below.

As shown in FIG. 2, a procedure for producing the tube 2 is comprised of a material kneading step, a tube blank extruding step, a cutting step, an air valve mounting step, a joining step, a port forming step, a first vulcanizing step, a sealant filling step, a raw rubber sheet affixing step, a second vulcanizing step and an inspecting step.

Figure 3:
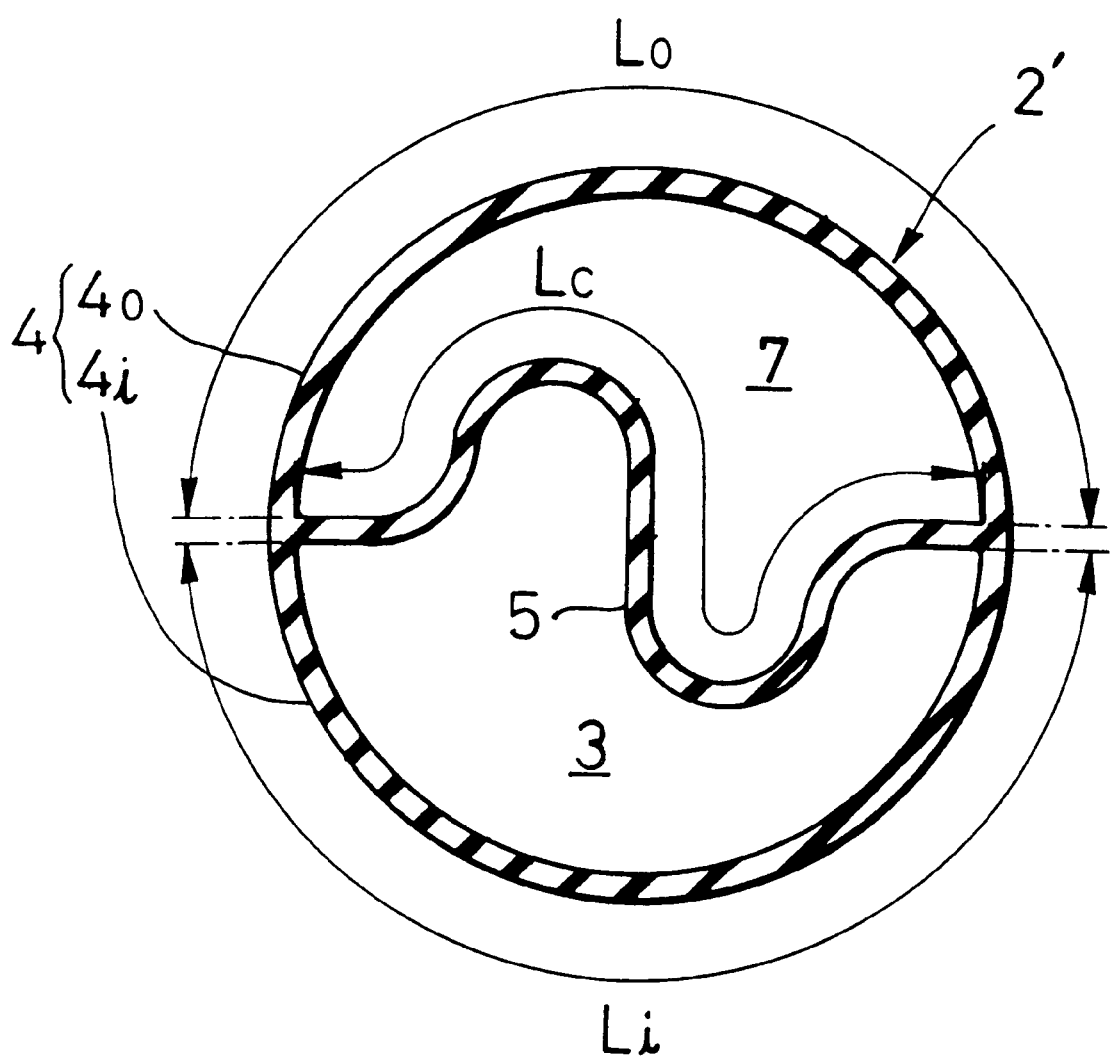
Figure 4:
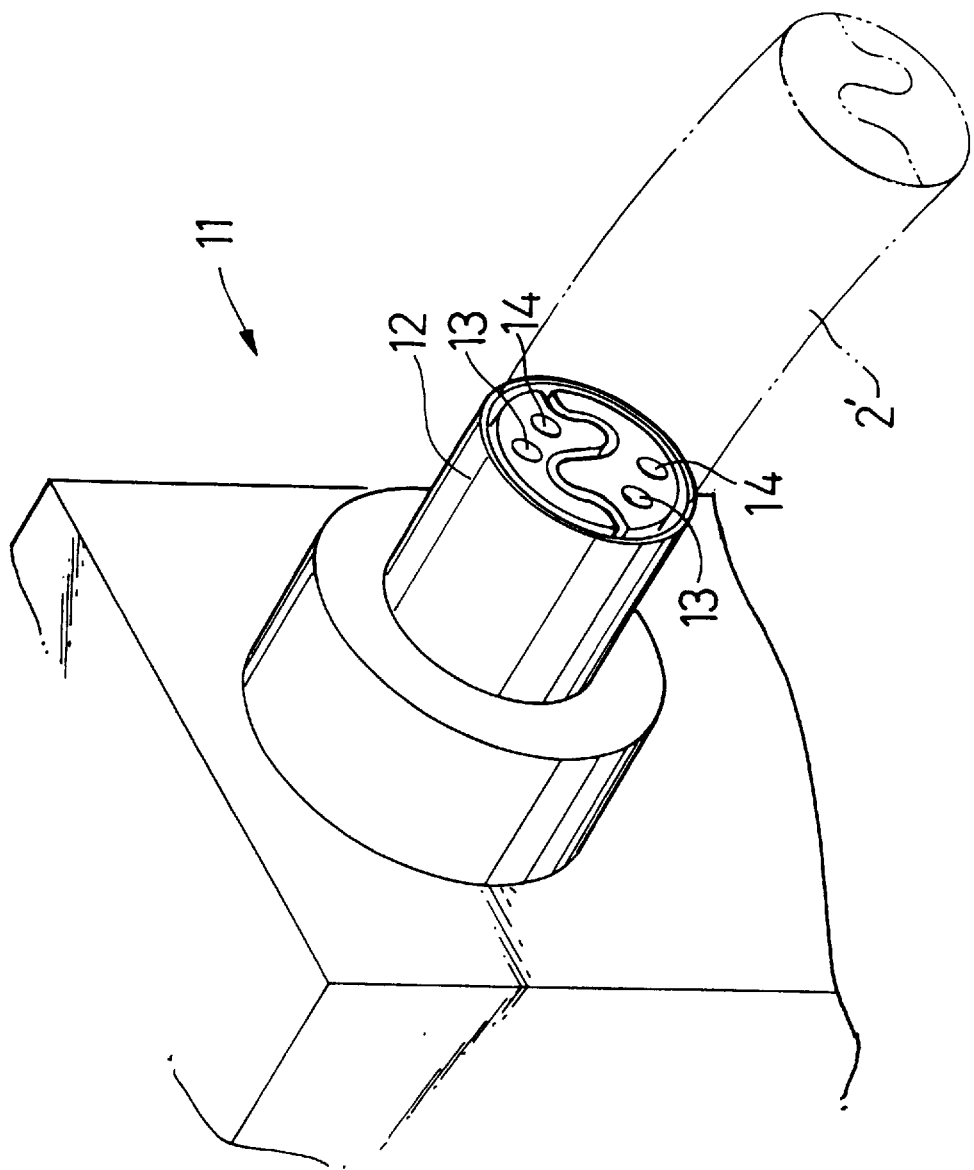
Figure 5:
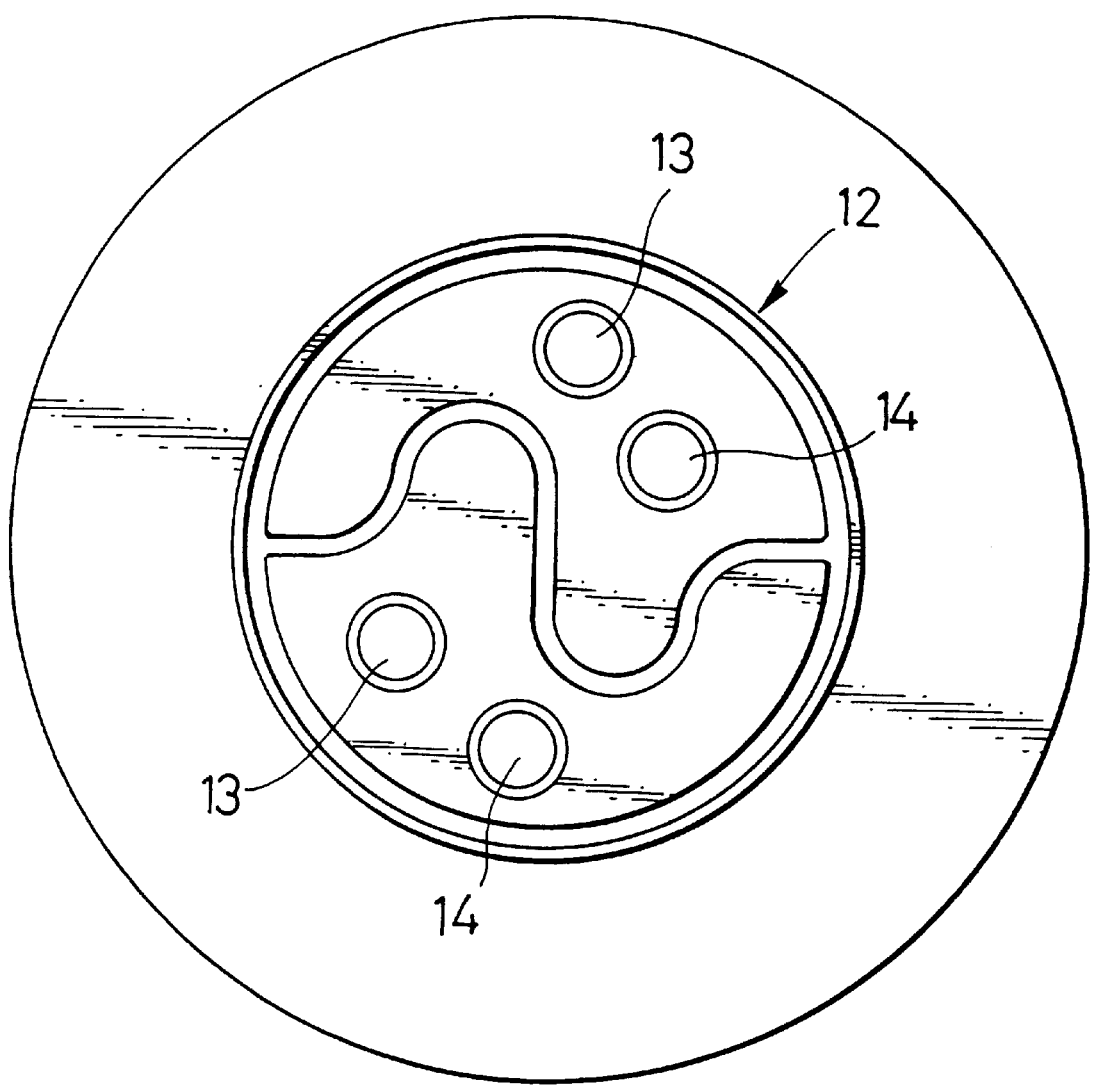

First, a tube blank 2' of a raw rubber is formed by subjecting a material resulting from the kneading at the material kneading step to the extrusion at a tube blank extruding step. As shown in FIGS. 3 to 5, the tube blank 2' formed by continuous extrusion from a nozzle 12 of an extrusion molding machine 11 includes a peripheral wall 4 which is circular in cross section, and a partition wall 5 which connects two points located on the diameter of the peripheral wall 4 into a wavy shape. The peripheral wall 4 is divided at the connection with the partition wall 5 into an air chamber peripheral wall 4i and a sealant chamber peripheral wall 4o, so that the length Li of the air chamber peripheral wall 4i, the length Lo of the sealant chamber peripheral wall 4o and the length Lc of the partition wall are set equal to one another. By forming the partition wall 5 into the wavy shape, the length Lc can be ensured without production of a steeply bent portion.

Two release agent discharge ports 13, 13 and two release agent intake ports 14, 14 for discharging and supplying a release agent such as talc or the like from and to the air chamber 3 and the sealant chamber 7 are provided in the nozzle 12 of the extrusion molding machine 11 for molding the tube blank 2' by extrusion. By forming the air chamber 3 and the sealant chamber 7 in the tube blank 2' at the same sectional area by the partition wall 5 having the wavy shape in section, a space for disposition of the release agent discharge ports 13, 13 and the release agent intake ports 14, 14 can be easily ensured.

At the subsequent cutting step, the tube blank 2' is cut into a predetermined length and then, at the air valve mounting step, the air valve 6 is mounted in a suitable place of the air chamber peripheral wall 4i. Further, at the joining step, opposite ends of the tube blank 2' are joined to each other.

Figure 6:
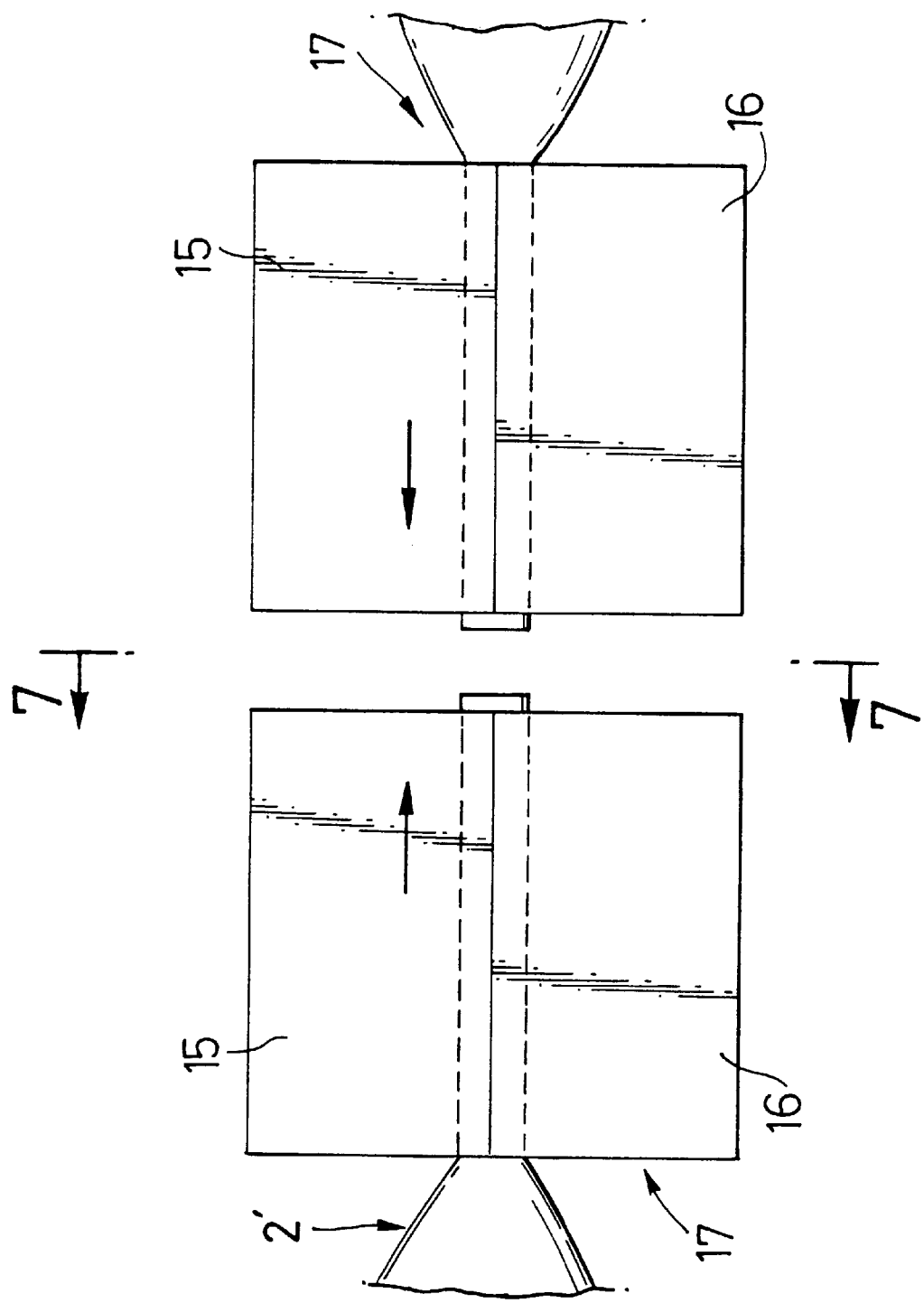
Figure 7:
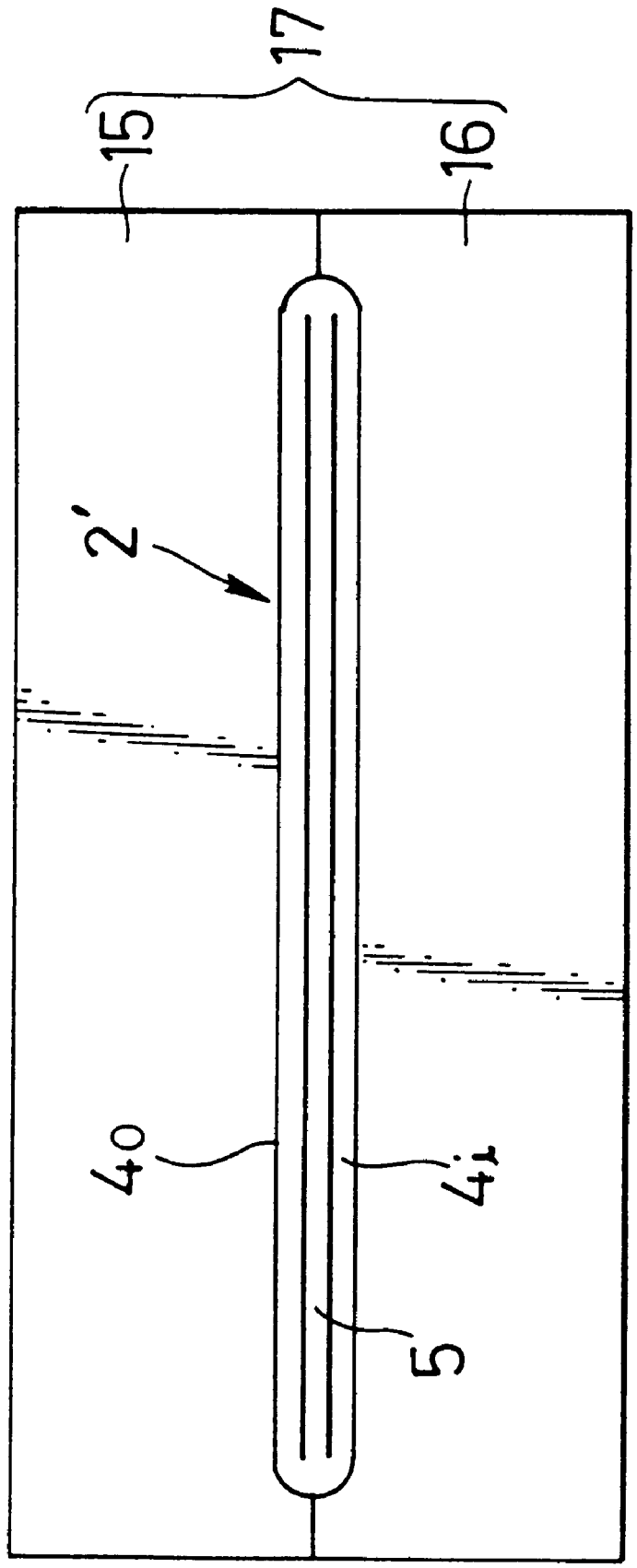

FIGS. 6 and 7 show a splicer used at the joining step. The opposite ends of the tube blank 2' are clamped by a clamp 17 which is comprised of a pair of clamp members 15 and 16, so that the opposite end faces of the tube blank 2' slightly protruding from the clamp members 15 and 16 are pressure-joined to each other. The tube blank 2' made of the raw rubber before being vulcanized is formed into an annular shape by the pressure-joining.

At this time, in order to exactly join portions of the air chamber peripheral wall 4i, the partition wall 5 and the sealant chamber peripheral wall 4o at one end of the tube blank 2' to portions of the air chamber peripheral wall 4i, the partition wall 5 and the sealant chamber peripheral wall 4o at the other end of the tube blank 2', the partition wall 5 is clamped between the air chamber peripheral wall 4i and the sealant chamber peripheral wall 4o by the clamp 17 to form three layers (see FIG. 7). Since the length Li of the air chamber peripheral wall $4i$, the length Lc of the partition wall 5 and the length Lo of the sealant chamber peripheral wall $4o$ are set equal to one another (see FIG. 3), as described above, the air chamber peripheral wall $4i$, the partition wall 5 and the sealant chamber peripheral wall $4o$ are clamped as being of natural length without being compressed or expanded. Thus, the air chamber peripheral wall $4i$, the partition wall 5 and the sealant chamber peripheral wall $4o$ can be prevented from being wrinkled and hence, the joining of them can be reliably achieved.

At the subsequent port forming step, an air relief port $4_1$ communicating with the sealant chamber 7 is made in the sealant chamber peripheral wall $4o$ in the tube blank 2'.

Figure 8:
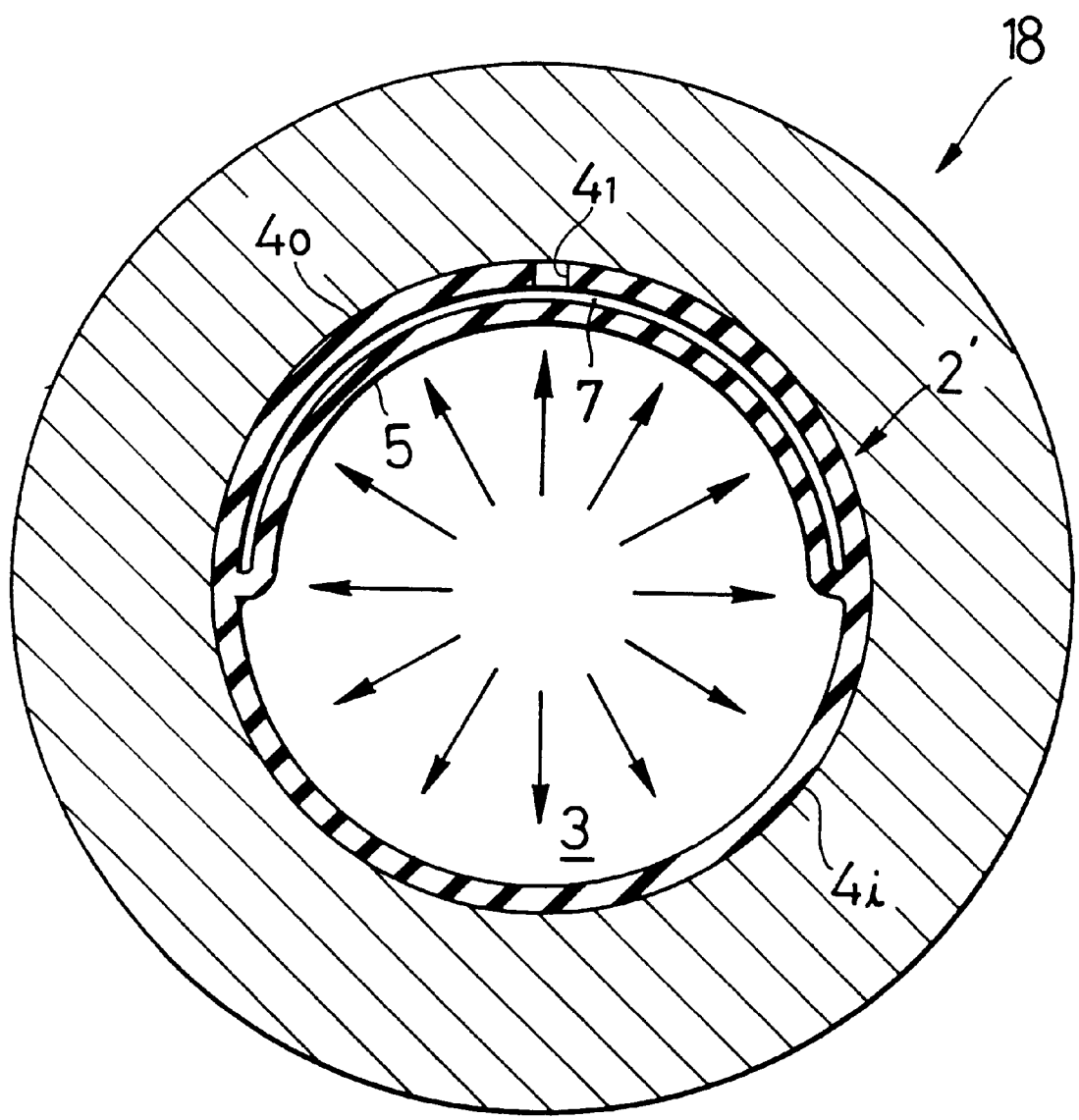

Then, at the first vulcanizing step, the tube blank 2' is placed into the heating die 18, as shown in FIG. 8, and heated air or water vapor of a high temperature is supplied through the air valve 6 into the air chamber 3, thereby bringing the air chamber peripheral wall $4i$ and the sealant chamber peripheral wall $4o$ into close contact with the heating die 18 and bringing the partition wall 5 into close contact with the sealant chamber peripheral wall $4o$. In this state, the heating die 18 is heated to perform the vulcanization. In this case, even if air remains in the sealant chamber 7 in the tube blank 2' placed in the heating die 18, the air remaining in the sealant chamber 7 can be discharged through the air relief port $4_1$ to reliably bring the partition wall 5 into close contact with the sealant chamber peripheral wall $4o$, when the partition wall 5 is urged toward the sealant chamber peripheral wall $4o$ by the pressure of the heated air or the high-temperature water vapor supplied to the air chamber 3. Thus, the entire tube blank 2' can be uniformly heated to achieve a reliable vulcanization.

Figure 9:
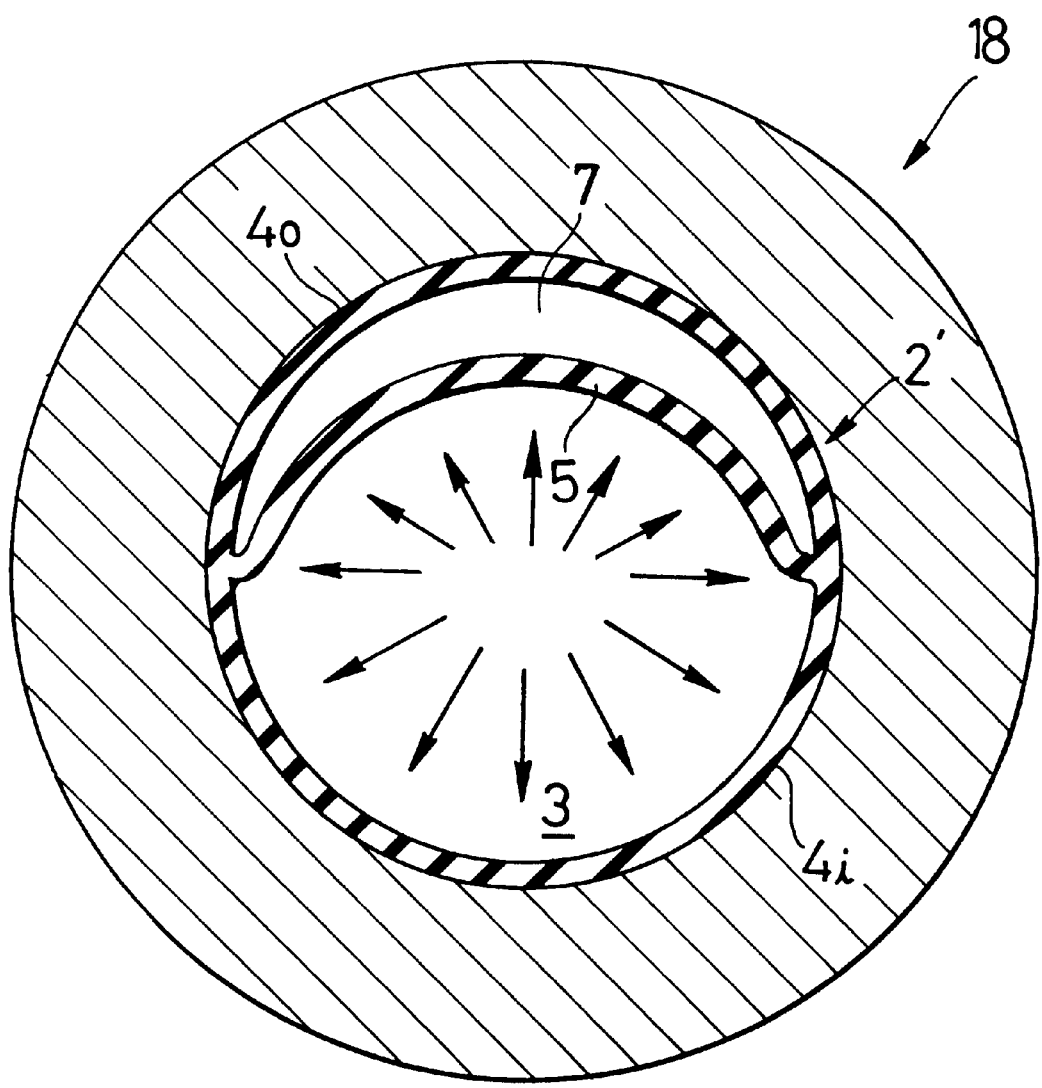

If no air relief port $4_1$ is provided in the sealant chamber peripheral wall $4o$, even if a pressure is applied to the air chamber 3, as shown in FIG. 9, the partition wall 5 is failed to be brought into close contact with the sealant chamber peripheral wall $4o$ by the obstruction of the air remaining in the sealant chamber 7, thereby casing a possibility that the tube blank 2' is unevenly heated.

At the next sealant filling step, the sealant 8 is filled through the air relief port $4_1$ into the sealant chamber 7. In this case, prior to the filling of the sealant 8, air is supplied through the air valve 6 to expand the air chamber 3, thereby bringing the partition wall 5 into close contact with the sealant chamber peripheral wall $4o$, with the air in the sealant chamber 7 being completely discharged, as in a state shown in FIG. 8. The filling of the sealant 8 is started in this state. Since the sealant 8 is filled into the sealant chamber 7 in this manner utilizing the air relief port $4_1$, it is not required that a special bore for filling of the sealant 8 is provided. In addition, by starting the filling of the sealant 8 in the state in which the air in the sealant chamber 7 has been completely discharged, the incorporation of air into the sealant 8 can be reliably prevented, and only the sealant 8 can be filled. Further, since the air is supplied to the air chamber 3 utilizing the air valve 6, it is not required that a bore for filling of air is provided in the air chamber peripheral wall $4i$.

At the subsequent raw rubber sheet affixing step, a raw rubber sheet 19 is affixed to cover the air relief port $4_1$, and then, at the second vulcanizing step, a portion of the tube blank 2' in the vicinity of the raw rubber sheet 19 is locally vulcanized to close the air relief port 41, thereby completing the tube 2. The contents of the raw rubber sheet affixing step will be further described. That portion of the tube blank 2' with the raw rubber sheet 19 affixed thereto which is around the air relief port $4_1$ is subjected to a surface treatment with a wire brush or a sandpaper, a powder or talc of the tube blank 2', which is a foreign matter scraped by the wire brush or the sandpaper, is removed and cleaned with a solvent such as toluene or a rubber solvent. Then, a raw rubber sheet 19 having a diameter of 20 mm and a thickness of 1.5 mm is affixed to the air relief port $4_1$ and subjected to a vulcanizing and press-bonding treatment for 3 to 5 minutes under a pressure of 160 to 170 kg/m². In place of carrying out the surface treatment using the wire brush or the sandpaper, another method can be employed such as a cyclizing method using an acid, a chlorinating method, a methylene iodide method, an organic halogen method.

Figure 10A:
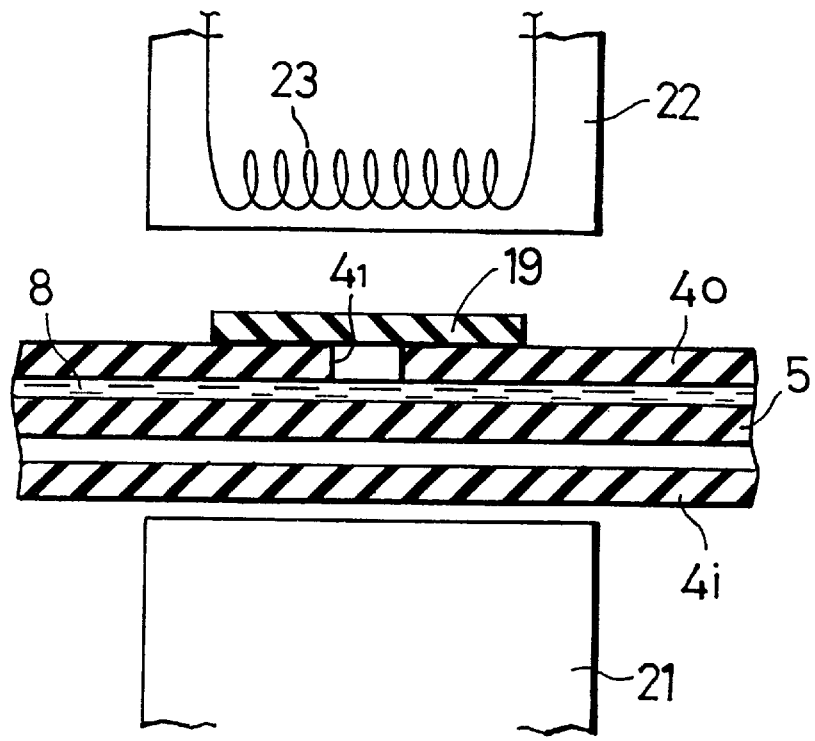
FIGS. 10A and 10B are views explaining the operations of a step of affixing a raw rubber sheet.
Figure 10B:
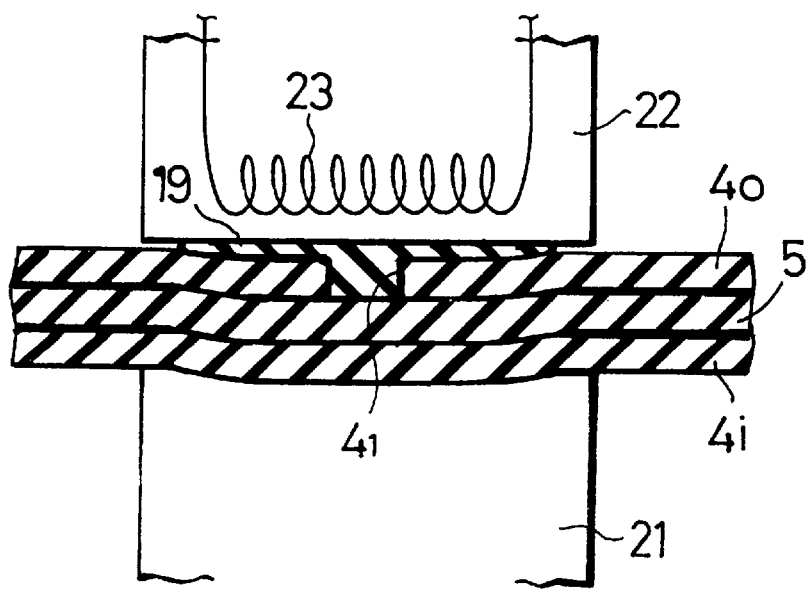

As shown in FIGS. 10A and 10B, the vulcanizing and press-bonding device includes a lower pressing element 21 and an upper pressing element 22 opposed to each other. An elastic material (JIS-A type of 20 to 40 degree) having a hardness lower than that (JIS-A type of 40 to 60 degree) of the tube blank 2' is used for the lower pressing element 21. Examples of the above-described elastic material having the lower hardness include various rubbers such as a silicone, a styrene/butadiene based rubber (SBR), an ethylene/propylene/diene based rubber (EPDM), a natural rubber, a nitrile-based rubber (NBR), a chloroprene-based rubber (CR) and the like.

A heater 23 is mounted within the upper pressing element 22 made of a metal. The tube blank 2' having the raw rubber sheet 19 affixed thereto around the air relief port $4_1$ is clamped between the lower and upper pressing elements 21 and 22 for press-bonding. At this time, the raw rubber sheet 19 contacting the upper pressing element 22 and a portion of the tube blank 2' at the peripheral edge of the raw material sheet 19 are vulcanized by heating by the heater 23.

If the lower pressing element 21 is made of a metal having a hardness higher than that of the raw rubber sheet 19, a portion of the tube blank 2' having the raw rubber sheet 19 affixed thereto is swollen up like a nodule. However, the hardness of the lower pressing element 21 lower than that of the tube blank 2' ensures that the boundary between the peripheral edge of the affixed raw rubber sheet 19 and the tube blank 2' becomes smooth, and the raw rubber sheet 19 is hard to be peeled off, but also a beautiful external shape is achieved. It is believed that the reason why this effect is obtained is that the raw rubber sheet 19 is sunk into the tube blank 2' by downward depression of the lower pressing element 21 located under the raw rubber sheet 19 along with the tube blank 2' during the press-bonding, resulting in a decreased difference in level between the peripheral edge of the raw rubber sheet 19 and the tube blank 2'.

Since the air relief port $4_1$ is closed using the raw rubber sheet 19 which is the same material as that for the tube blank 2' as described above, the strength of the closed portion can be enhanced to reliably prevent the leakage of the sealant 8. The completed tube 2 is inspected at the inspecting step to complete the producing process.

Provided that the air relief port $4_1$ is not formed in the tube blank 2', when the tube blank 2' is removed from the heating die 18 after completion of the first vulcanizing step, the pressure in the tightly closed sealant chamber 7 is risen by the thermal expansion of the remaining air encapsulated in the sealant chamber 7 due to absence of the air relief port $4_1$, while the pressure in the air chamber 3 becomes equal to the atmospheric pressure by the withdrawal of the heated air or the high-temperature water vapor. As a result, the sealant chamber 7 is expanded to push and expand the partition wall 5 toward the air chamber 3, as shown in FIG. 11A and hence, the partition wall 5 is provided with an expanding tendency that forces the wall 5 to be stretched and expanded toward the air chamber 3.

When the sealant chamber peripheral wall 4o of the tube 2 produced from such tube blank 2' and the partition wall 5 are wound by stabbing with a nail or the like, the partition wall 5 is expanded toward the air chamber 3 by the expanding tendency, as shown in FIG. 11B. Thus, the air in the air chamber 3 is passed through the stabbed wound in the partition wall 5 into the sealant chamber 7, and the air is incorporated into the sealant 8 to reduce the effect of the sealant 8. In this embodiment, however, since the air relief port $4_1$ is formed in the sealant chamber peripheral wall 4o, the sealant chamber 7 in the tube blank 2' removed from the heating die 18 cannot be thermally expanded by the remaining air and hence, the provision of the expanding tendency to the partition wall 5 can be reliably avoided.

Although the embodiment of the present invention has been described in detail, it will be understood that the present invention is not limited to the above-described embodiment, and various modifications in design may be made without departing from the subject matter of the present invention defined in claims.

Figure 12A:
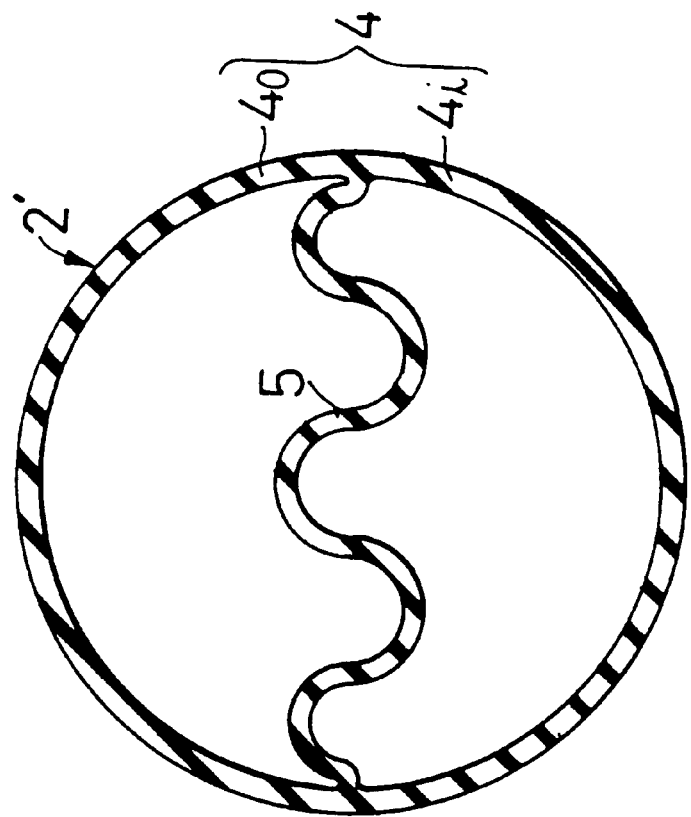
FIGS. 12A and 12B are views of other embodiments of the tube blank.
Figure 12B:
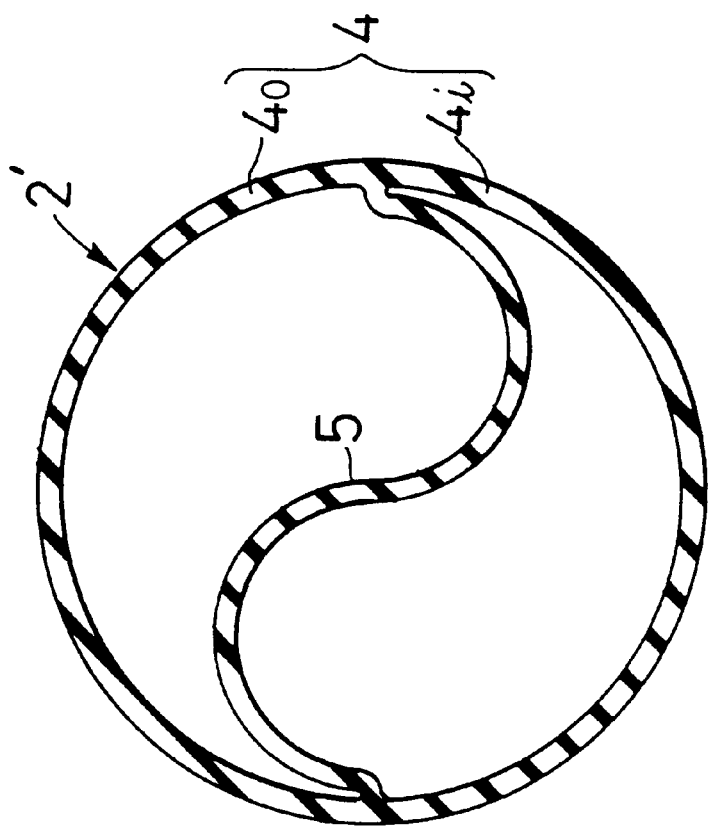

For example, the shape of the partition wall 5 in extruding the tube blank 2' is not limited to the wavy shape shown in the embodiment, and may be any of other wavy shapes as shown in FIGS. 12A and 12B.

What is claimed is:

1. A process for producing a sealant-incorporated tire tube which has an air chamber (3) filled with air and a sealant chamber (7) filled with a sealant (8), the process comprising:

a first step of obtaining by extrusion molding a tube blank (2') having a peripheral wall (4) of a circular cross section, the tube blank (2') being divided inside the peripheral wall (4) into the air chamber (3) and the sealant chamber (7) by a partition wall (5);

a second step of joining opposite ends of the tube blank (2') together to form the blank into an annular configuration;

a third step of forming an air relief port ($4_1$) in the peripheral wall (4) which port is communicated with the sealant chamber (7);

a fourth step of placing the tube blank (2') in a heating die (18) and in that state subjecting the blank to vulcanization with supply of a gas of a high temperature and high pressure into the air chamber (3);

a fifth step of filling the sealant chamber (7) with the sealant (7); and a sixth step of closing the air relief port ($4_1$).

2. The process according to claim 1, wherein in said fifth step the sealant (8) is filled into the sealant chamber (7) through the air relief port ($4_1$).

3. The process according to claim 1, wherein said sixth step is a step of clamping the tube blank (2') having a raw rubber sheet (19) placed on said air relief port ($4_1$) between a pair of pressing elements (21,22) and pressing and binding them, and wherein one of the pressing elements (21) which abuts against the blank on the side opposite the raw rubber sheet (19) has a hardness lower than that of the tube blank (2').

* * * * *